United States Patent
Krtolica et al.

(10) Patent No.: US 6,259,814 B1
(45) Date of Patent: Jul. 10, 2001

(54) IMAGE RECOGNITION THROUGH LOCALIZED INTERPRETATION

(75) Inventors: Radovan V. Krtolica, Los Gatos; Roger D. Melen, Los Altos Hills, both of CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/953,338

(22) Filed: Oct. 17, 1997

(51) Int. Cl.$^7$ .............................. G06K 9/56; G06K 9/62
(52) U.S. Cl. ............................................ 382/205; 382/209
(58) Field of Search .................................... 382/205, 195, 382/209, 228, 229, 198

(56) References Cited

U.S. PATENT DOCUMENTS

| | | | |
|---|---|---|---|
| 4,379,283 | 4/1983 | Ito et al. | 382/205 |
| 4,437,122 | 3/1984 | Walsh et al. | 348/625 |
| 4,521,909 | 6/1985 | Wang | 382/227 |
| 4,648,119 | 3/1987 | Wingfield et al. | 382/205 |
| 4,799,270 | 1/1989 | Kim et al. | 382/205 |
| 4,979,221 | 12/1990 | Perryman et al. | 382/205 |
| 5,125,048 | 6/1992 | Virtue et al. | 382/205 |
| 5,337,370 | 8/1994 | Gilles et al. | 382/14 |
| 5,386,483 | 1/1995 | Shibazaki | 382/162 |
| 5,539,840 | 7/1996 | Krtolica et al. | 382/195 |
| 5,555,317 | 9/1996 | Anderson | 382/159 |
| 5,559,530 | 9/1996 | Yamashita et al. | 345/136 |
| 5,680,476 | 10/1997 | Schmidt et al. | 382/159 |
| 5,689,343 | 11/1997 | Loce et al. | 382/209 |
| 5,875,264 | 2/1999 | Carlstrom | 382/181 |

*Primary Examiner*—Amelia Au
*Assistant Examiner*—Martin Miller
(74) *Attorney, Agent, or Firm*—Fenwick & West LLP (57) ABSTRACT

A printed or handwritten character image is recognized by training (301) a plurality of lookup tables with a set of known referent characters; obtaining (302) a bitmap of a character image to be recognized; mapping (303) the bitmap onto a standardized character matrix; partitioning (304) the matrix into a plurality of sub-matrices; (305) determining a set of candidates for each sub-matrix; and selecting (306) a preferred candidate from among the set of candidates responsive to at least one pre-defined selection criterion. The invention is implemented by means of a scanner (102), a character mapper (104), a matrix partitioner (106), a candidate set builder (108), and a character selector (110).

5 Claims, 9 Drawing Sheets

| 1 | 2 | 3 | 4 |
|---|---|---|---|
| 5 | 6 | 7 | 8 |
| 9 | 10 | 11 | 12 |
| 13 | 14 | 15 | 16 |

(a)

| 1 | 2 | 3 | 4 |
|---|---|---|---|
| 5 | 6 | 7 | 8 |
| 9 | 10 | 11 | 12 |
| 13 | 14 | 15 | 16 |

(b)

| 1 | 2 | 3 | 4 |
|---|---|---|---|
| 5 | 6 | 7 | 8 |
| 9 | 10 | 11 | 12 |
| 13 | 14 | 15 | 16 |

IMAGE RECOGNITION THROUGH LOCALIZED INTERPRETATION

TECHNICAL FIELD

The present invention relates generally to image processing, and specifically to image recognition by partitioning a matrix representing a character or other image into a plurality of sub-matrices and performing localized interpretation of said sub-matrices by means of lookup tables.

BACKGROUND ART

The field of optical character recognition (OCR) has long been applied to the problem of recognizing machine-printed characters from a page of text. However, special problems exist when attempting to recognize handwritten characters, even in the case of constrained, hand-printed formats used by pen-based or "palm top" computers. The difficulty lies in the extreme variability of such images. Historically, no single OCR algorithm has proven adequate to recognize handwritten characters with the desired level of accuracy.

One method of reducing variability has been to map a character image onto a grid of boxes, producing a standardized matrix that can be compared against a set of referents. U.S. Pat. No. 5,539,840 to Krtolica et al. discloses such an approach in which a character image is mapped onto a 16×16 matrix. Despite improvements brought about by this technique, there remains a substantial amount of image variability. Thus, there remains a need for an algorithm providing even greater accuracy.

Theoretically, it should be possible for a machine to recognize a character image as well as a human provided that the recognition system is trained with all possible images and sufficient memory is provided to record the learned patterns. This "brute force" method would be nearly error free, except for the effects of noise and the process of quantizing the images to fit the standard matrix. However, such a method is highly impractical. For a 16×16 bi-level character image, there are exactly $2^{256}$ (nearly $10^{80}$) unique patterns. Aside from the technical difficulty in storing this many patterns, the time required to recognize the image as well as train the system with all possible referent characters would be excessive.

Thus, there remains a need for a highly accurate recognition system that is not overly sensitive to the effects of character image variability. Moreover, there remains a need for a recognition system that is efficient both in terms of recognition time and storage requirements.

DISCLOSURE OF INVENTION

The present invention addresses the image variability problem while reducing the need for system resources. Although the following discussion centers on the problem of character recognition, one skilled in the art will understand that the same principles apply to recognizing other types of images. A document often includes elements other than text, such as diagrams or photographs. Thus, the scope of the present invention should not be limited to recognizing only printed or handwritten characters.

Figure 3:
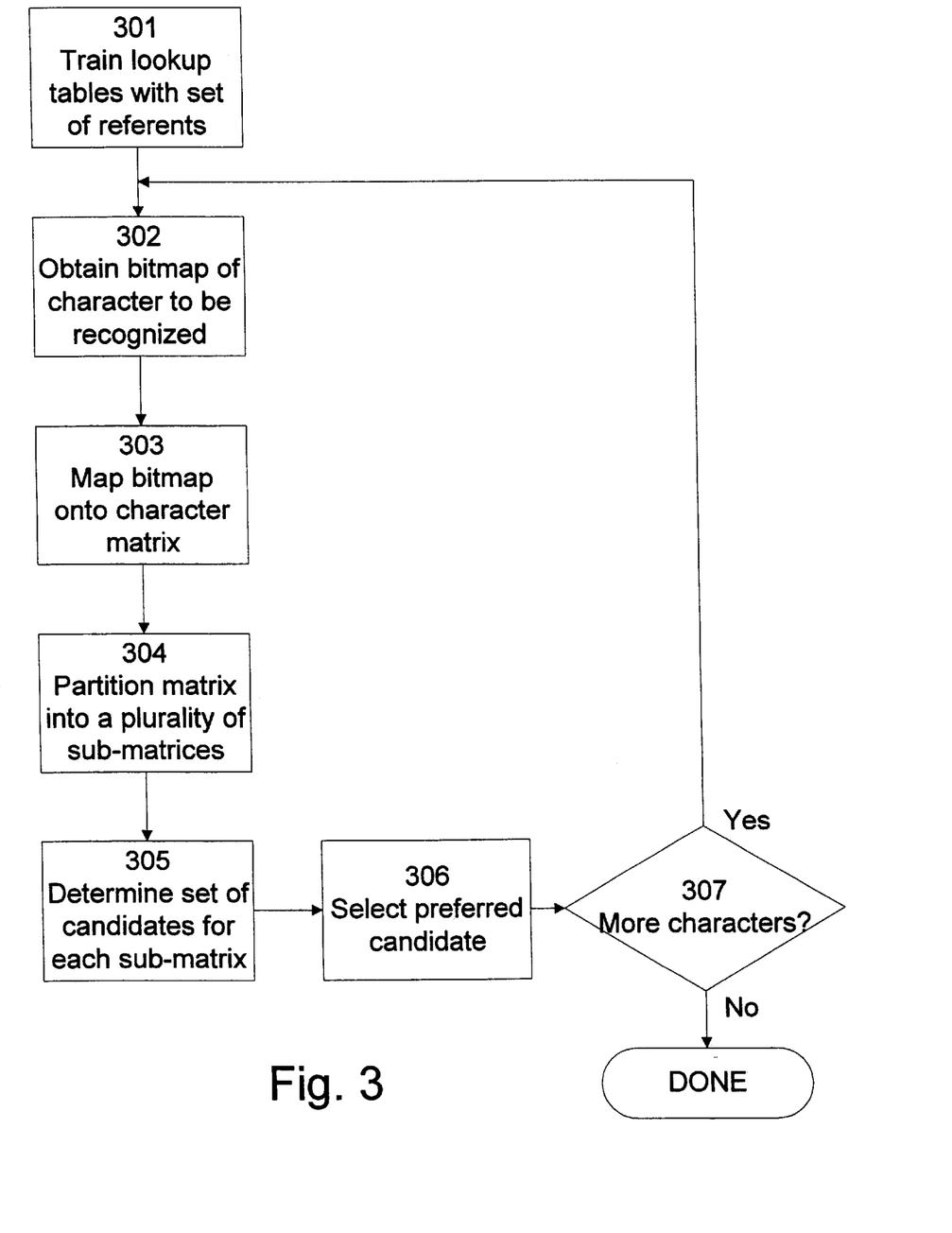
FIG. 3 is a flow diagram for a method of image recognition in accordance with the present invention.

In accordance with the present invention, a character image is recognized by training (301) a lookup table with a set of known referent characters; obtaining (302) a bitmap of a character image to be recognized; mapping (303) the bitmap onto a standardized character matrix; partitioning (304) the matrix into a plurality of sub-matrices; determining (305) a set of candidates for each sub-matrix; and selecting (306) a preferred candidate from among the set of candidates responsive to at least one pre-defined selection criterion.

Figure 6A:
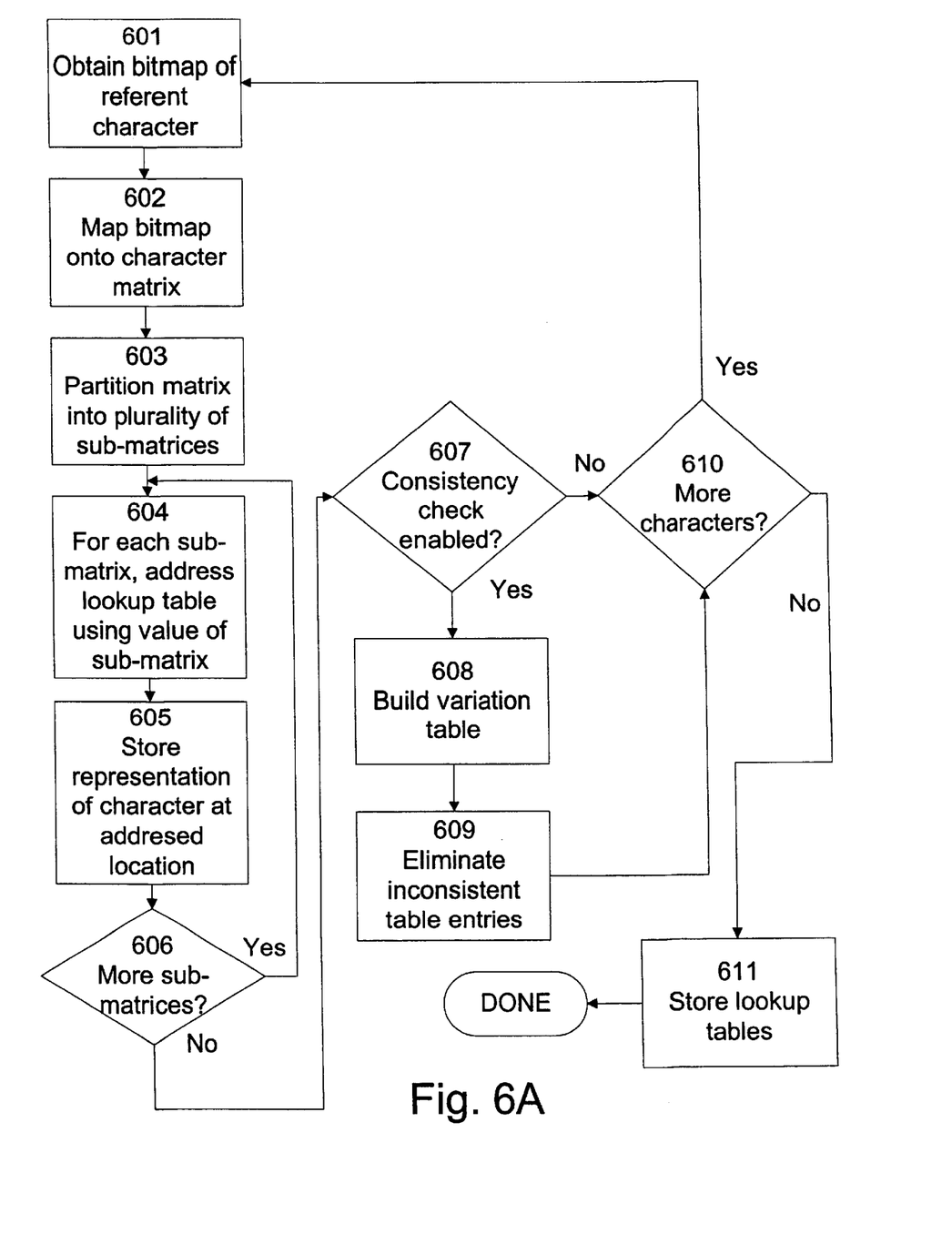
FIG. 6A is a flow diagram for training the recognition apparatus 100 in accordance with the present invention.

In another aspect of the invention, the lookup table is trained by obtaining (601) a bitmap of a referent character; mapping (602) the bitmap onto a standardized character matrix; partitioning (603) the matrix into a plurality of sub-matrices; addressing (604), for each sub-matrix, a lookup table using a binary representation of the sub-matrix as an index into said table; and storing (605), in each addressed table entry, a representation of the referent character.

Figure 7:
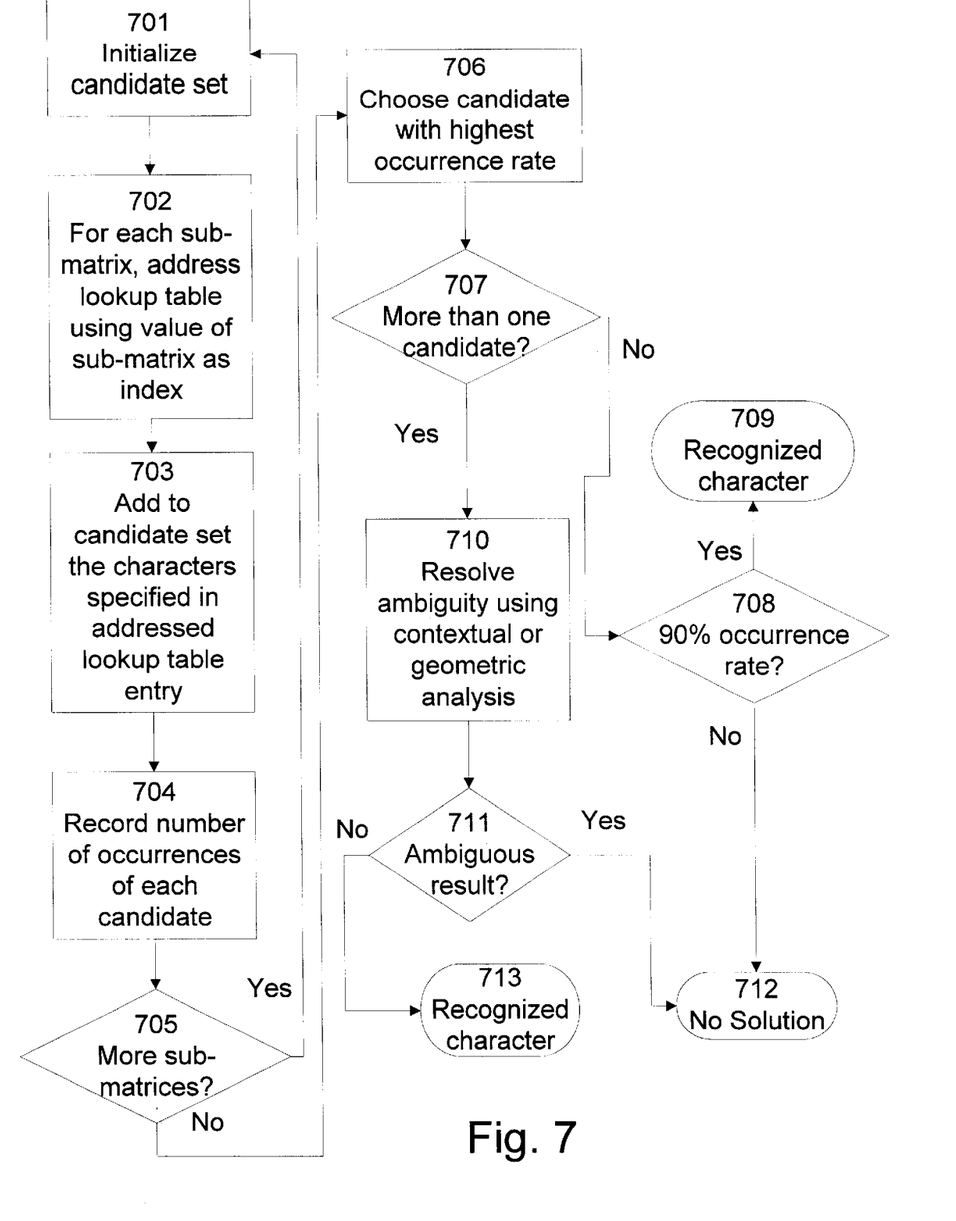
FIG. 7 is a flow diagram for determining a candidate set 206" and selecting a preferred candidate character in accordance with the present invention.

In yet another aspect of the invention, a candidate set is determined by initializing (701) a candidate set; addressing (702), for each sub-matrix, a lookup table using a binary representation of the sub-matrix as an index into said table; adding (703) to a candidate set, characters corresponding to addressed entries of said table; and recording (704) the number of occurrences of each candidate.

Figure 1:
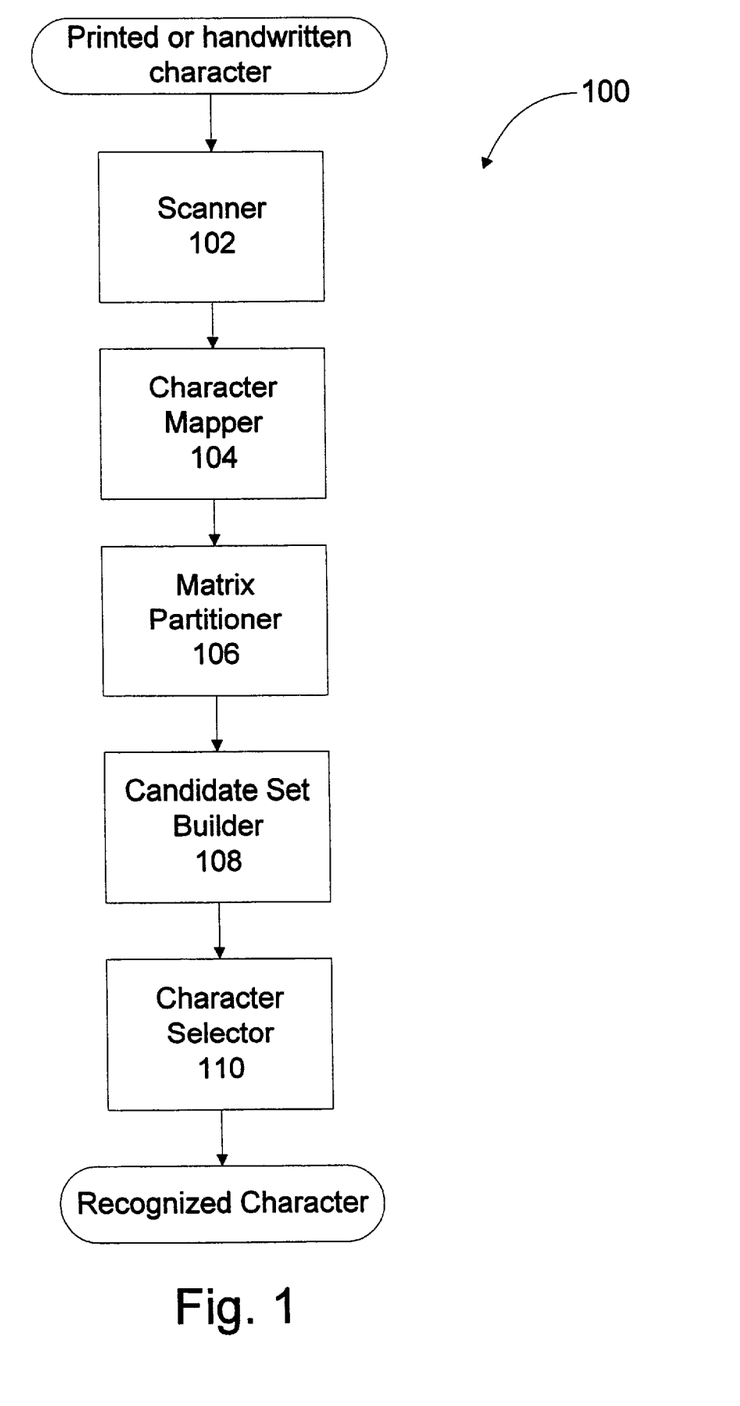
FIG. 1 is a functional block diagram of an apparatus 100 for recognition of a character image in accordance with the present invention.

In accordance with the invention, apparatus (100) for pattern recognition includes a scanner (102), a character mapper (104), a matrix partitioner (106), a candidate set builder (108), and a character selector (110).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Referring now to FIG. 1, there is shown a apparatus 100 for recognizing the pattern of a Character in accordance with the present invention. Briefly, apparatus 100 comprises five major functional blocks. Scanner 102 obtains a two-dimensional array of pixel values representing the character to be recognized. Character mapper 104 maps the scanned image onto a character matrix according to pixel density or connectivity. Matrix partitioner 106 partitions the character matrix into a plurality of sub-matrices. Candidate set builder 108 uses a binary representation of each sub-matrix as an index into a lookup table in order to determine the set of possible candidate characters. Character selector 110 selects a preferred candidate character based on at least one predefined selection criterion.

Figure 2:
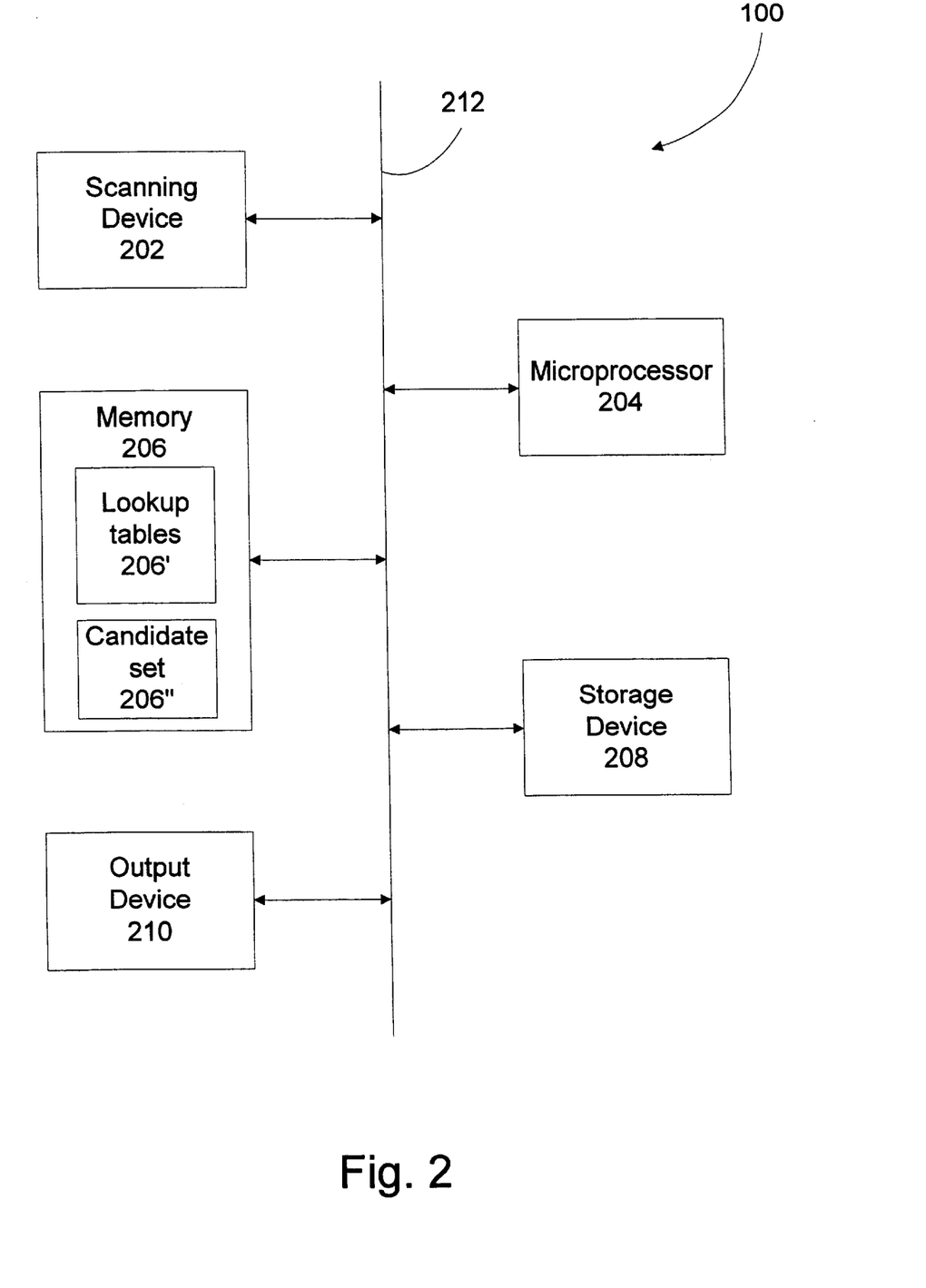
FIG. 2 is a physical block diagram of the apparatus 100 of FIG. 1, in accordance with the present invention.

Referring now to FIG. 2, there is shown a physical block diagram of system 100 indicating components used to implement the functionality of blocks 102, 104, 106, 108, and 110 shown in FIG. 1. In a preferred embodiment, scanner 102 is implemented by a scanning device 202, for example, an "HP ScanJet IIc" model digital scanner from Hewlett Packard Co., which provides a resolution of 400 dots (pixels) per inch, each pixel being quantized with an eight-bit gray scale resolution. Character mapper 104, matrix partitioner 106, candidate set builder 108, and character selector 110 are each implemented by means of a microprocessor 204, in conjunction with memory 206, storage device 208, and output device 210, all of which are coupled to data bus 212. In a preferred embodiment, a conventional IBM PC® or compatible is used. Thus, microprocessor 204 could comprise a 200 MHz or faster Intel® Pentium® processor. Memory 206 could be implemented by any combination of RAM, ROM, EPROM, or other memory circuitry. Storage device 208 could include a hard disk, CD-ROM, magneto-optical drive, DVD, flash memory, or other mass storage device. Output device 210 could comprise a CRT display, a printer, a network adapter, a modem, or the like. It should be recognized, however, that a number of alternative physical devices and implementations could be readily used to provide the functionality illustrated in FIG. 1.

Referring now to FIG. 3, there is shown a flow diagram for a method of image recognition in accordance with the present invention. Processing begins by training 301 a plurality of lookup table 206' with a set of referent characters. As detailed hereafter with reference to FIG. 6A, the process of training involves scanning a set of referent characters, creating and partitioning matrices for each referent, and storing matrix data in a plurality of lookup tables 206'.

Figure 4:
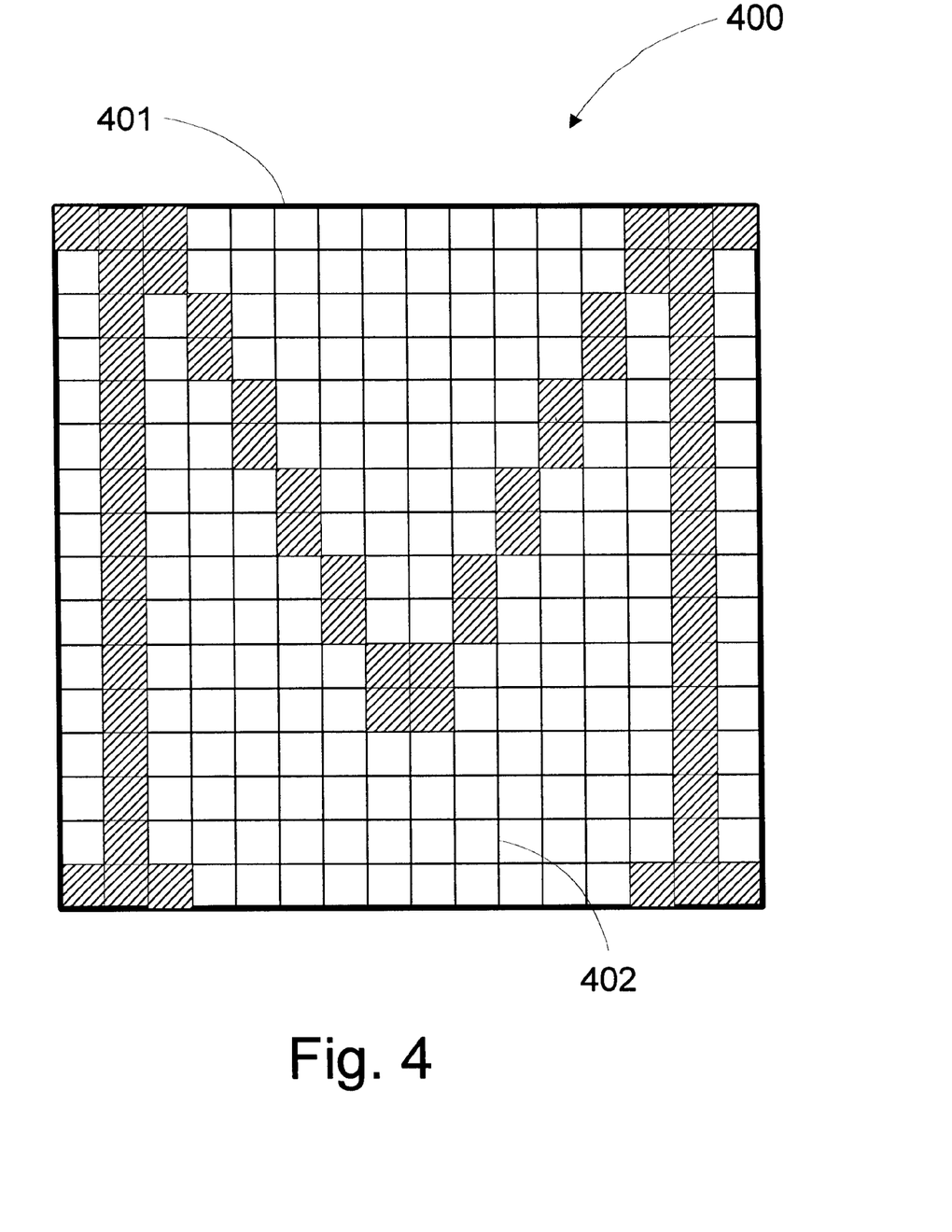
FIG. 4 illustrates a minimally bounded character bitmap image 400 mapped onto a character matrix in accordance with the present invention.

Processing continues with obtaining 302 a bitmap of the character to be recognized. FIG. 4 illustrates a character bitmap 400 representing the letter "M." Such a bitmap 400 may be obtained by operation of scanner 102, which obtains a pixel-by-pixel representation of an image on a scanned object, typically a piece of paper. The process of segmenting an individual character bitmap from a page of text and assigning to the bitmap a minimum bounding rectangle 401 is described in U.S. Pat. No. 5,539,840 to Krtolica et al. for Multifont Optical Character Recognition Using a Box Connectivity Approach, which is incorporated herein by reference. Minimum bounding rectangle 401 is defined as the smallest rectangle that completely contains a discrete pattern of a character. Because the physical dimensions of characters often vary on a printed page, the pixel dimensions of the minimum bounding rectangle will also vary.

Referring again to FIG. 3, processing continues with mapping 303 minimally-bounded bitmap 400 onto a two-dimensional array or matrix, referred to herein as a character matrix. Said matrix is standardized, having identical dimensions for each recognizable character, and is preferably 16 elements high by 16 elements wide. Moreover, said matrix elements are preferably represented by single bits that may be selectively set or reset. One skilled in the art will recognize that many other encoding methods are possible without departing from the spirit of the invention. However, a packed array of bits is efficient, both in terms of memory requirements and implementation logic.

The mapping process is accomplished by dividing bitmap 400 into a grid of boxes 402, each box corresponding to an element of the character matrix. In a preferred embodiment, bitmap 400 is divided into a grid of boxes 16 boxes wide by 16 boxes high. Character mapper 104 analyzes the pixels falling within the boundaries of each box and sets the binary value of the corresponding matrix element to either zero or one, depending on the analysis method used. Analysis methods include pixel density and either horizontal or vertical pixel connectivity, all of which are well known to one skilled in the art of image recognition. A matrix processing system of this type is disclosed in U.S. Pat. No. 5,539,840 to Krtolica et al. for Multifont Optical Character Recognition Using a Box Connectivity Approach, which is incorporated herein by reference. For example, a matrix corresponding to bitmap 400 based on pixel density is:

```
1 1 1 0 0 0 0 0 0 0 0 0 0 1 1 1
0 1 1 1 0 0 0 0 0 0 0 0 0 1 1 0
0 1 0 1 0 0 0 0 0 0 0 1 0 1 0
0 1 0 1 0 0 0 0 0 0 0 1 0 1 0
0 1 0 0 1 0 0 0 0 0 0 1 0 0 1 0
0 1 0 0 1 0 0 0 0 0 0 1 0 0 1 0
0 1 0 0 0 1 0 0 0 1 0 0 0 1 0
0 1 0 0 0 1 0 0 0 1 0 0 0 1 0
0 1 0 0 0 0 1 0 0 1 0 0 0 0 1 0
0 1 0 0 0 0 1 0 0 1 0 0 0 0 1 0
0 1 0 0 0 0 0 1 1 0 0 0 0 0 1 0
0 1 0 0 0 0 0 1 1 0 0 0 0 0 1 0
0 1 0 0 0 0 0 0 0 0 0 0 0 0 1 0
0 1 0 0 0 0 0 0 0 0 0 0 0 0 1 0
0 1 0 0 0 0 0 0 0 0 0 0 0 0 1 0
1 1 1 0 0 0 0 0 0 0 0 0 0 1 1 1
```

Figure 5:
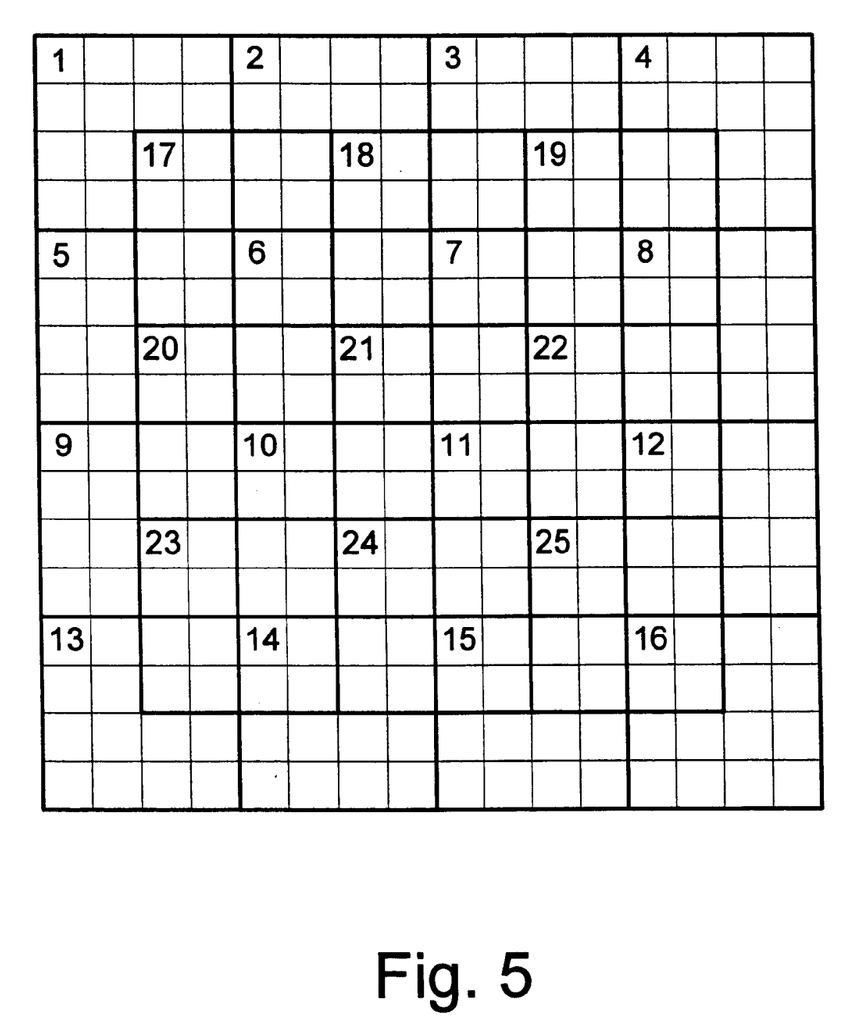
FIG. 5 illustrates a character matrix partitioned into a plurality of sub-matrices in accordance with the present invention.

Processing continues by partitioning 304 the character matrix into a plurality of sub-matrices. FIG. 5 illustrates a preferred embodiment of the invention wherein matrix partitioner 106 partitions the 16×16 character matrix into twenty-five 4×4 sub-matrices, each representing a $\frac{1}{16}$ fragment of the total character image. It should be noted, however, that the number and size of the sub-matrices are not central to the invention. Nevertheless, the size of a sub-matrix should be chosen with some minimum and maximum constraints in mind. First, the size should be small enough that the number of possible images per sub-matrix is relatively small compared to the size of conventional computer memories. For example, a preferred 4×4 sub-matrix produces $2^{16}$ or 65536 unique patterns. Thus, in a preferred embodiment, 25×65536×16 bytes (or 25 megabytes) of memory is needed to create lookup tables for recognizing the 128 character ASCII character set. In contrast, if the 16×16 matrix was not subdivided, a nearly $10^{80}$ byte lookup table would be required. Second, the size should be large enough that the sub-matrix produces a limited number of interpretations. As subdivisions become smaller, the set of candidates becomes larger, and at an extreme, i.e., a single pixel, the matrix represents all possible characters and conveys no useful information.

Additionally, the sub-matrices need not be square shaped, nor must they represent any discrete sub-division of the character image. For example, rectangular or triangular "sub-matrices" may also be used without departing from the spirit of the invention. The 4×4 configuration, however, is convenient because the 16 element sub-matrix readily converts into a short integer format, simplifying implementation in hardware and software.

A preferred layout of the sub-matrices is illustrated in FIG. 5, wherein each sub-matrix is identified by a number in its upper left-hand corner. Sub-matrices nos. 17 through 25 each overlap four other sub-matrices, a feature useful in canceling out the effects of the arbitrary partitioning of the original character matrix. For example, sub-matrix no. 17 overlaps sub-matrices nos. 1, 2, 5, and 6. Moreover, the central positioning of the nine additional sub-matrices is based on the fact that the center of the image generally provides more valuable pixel data than the edges. One skilled in the art, however, will recognize that the matrices may be repositioned in various configurations without departing from the spirit of the invention, although one sub-matrix should not completely overlap another sub-matrix since the data derived therefrom would be redundant.

Referring again to FIG. 3, processing continues by determining 305 a set of candidates for each sub-matrix. As will be detailed hereafter with reference to FIG. 7, this is accomplished by addressing, for each sub-matrix, one of a plurality of lookup tables 206' using a binary representation of the sub-matrix as an index into the table, adding characters corresponding to the addressed lookup table entries to a candidate set 206", and recording the number of occurrences of each candidate. Processing continues by selecting 306 a preferred candidate based on at least one pre-defined selection criterion. One skilled in the art will recognize that a variety of selection criteria are possible. As will be detailed hereafter with reference to FIG. 7, a preferred criterion requires that the selected character must be identified in at least a fixed percentage, such as 90%, of the sub-matrices.

Finally, a check 307 is made to determine whether there are more character images to recognize. If more characters exist, control returns to step 302; otherwise, the process terminates.

Referring now to FIG. 6A, there is shown a flow diagram for training the recognition apparatus 100 in accordance with the present invention. One skilled in the art will recognize that OCR systems are typically trained by the manufacturer, at which time referent characters are scanned and recorded on a storage medium like a hard disk or CD-ROM. Thus, the training step is not usually performed by an end-user of recognition apparatus 100.

Processing begins by obtaining 601 a bitmap of a referent character. Referents may be either printed or handwritten, and may be of various sizes or fonts. Moreover, for each recognizable character, a plurality of referents representing that character are obtained in order to compensate for the variability of character images. Processing continues with steps 602 and 603, which function substantially identically to steps 303 and 304, wherein the referent image is mapped 602 onto a character matrix, and the character matrix is partitioned 603 into a plurality of sub-matrices. Processing continues with addressing 604, for each sub-matrix, one of a plurality of lookup tables 206'. In a preferred embodiment, this is accomplished by converting the 16 element sub-matrix into a 16-bit integer index into the lookup table, wherein each element of the sub-matrix becomes one bit of the resultant index. Binary conversions of this variety are well known to those skilled in the art.

Memory 206 preferably comprises 25 lookup tables 206', one lookup table for each sub-matrix. Each lookup table 206' comprises $2^{16}$ entries of 128 bits each, where 16 represents the number of elements per sub-matrix (i.e., a 4×4 sub-matrix), and where 128 equals the number of recognizable characters (i.e., the ASCII character set). Thus, each lookup table entry can identify between 0 and 128 characters by setting one or more of the corresponding bits. Although one skilled in the art will recognize that other encoding methods may be used, such bit-level encoding greatly reduces the amount of memory required for lookup tables 206' and simplifies the implementation logic.

Processing continues with storing 605 a representation of the referent character at the addressed location. As explained above, this is accomplished by setting the corresponding bit in the table entry for the referent character. A check 606 is made whether there are more sub-matrices to process. If the answer is "yes," then control returns to step 604, otherwise, processing continues at step 607.

A check 607 is made whether consistency checking has been enabled. If the answer is "yes," then control passes to step 608; otherwise, processing continues at step 610. Consistency checking is a method of eliminating ambiguous lookup table entries during the training phase. Lookup table entries are ambiguous or inconsistent when two discrete characters, e.g. A and P, are valid interpretations for the same set of sub-matrices. This can happen due to scanning errors, noise, poor image quality, and many other factors. Permitting ambiguities to exist in lookup tables 206' is not necessarily harmful, but it can be harmful. Ambiguities can often be resolved at the post-recognition phase by contextual or geometric analysis. Consequently, in a preferred embodiment, consistency checking during image training is optional.

During a consistency check, a variation table is built 608 for the current referent character. One skilled in the art will recognize that a variation table may be constructed by a simple iterative process of scanning the lookup table entries for the identifying bit of the current referent. Sample variation tables for the characters "A" and "P" are provided below in Tables 1 and 2 for illustrative purposes only, and do not reflect actual data.

TABLE 1

Symbol Interpretation: A

| Sub-matrix | Sub-matrix Location Code | | | | | | | | | | |
|---|---|---|---|---|---|---|---|---|---|---|---|
| Value | 1 | 2 | 3 | 4 | 5 | 6 | 7 | 8 | 9 | ... | 25 |
| 0 | X | | X | | x | | | | x | | |
| 1 | | x | | | | | X | | | | |
| 2 | | | | x | X | | | | X | X | x |
| — | | | | X | | x | | | | | |
| — | x | x | | | | | X | | x | | |
| 6535 | x | X | x | | x | | | x | X | x | X |

TABLE 2

Symbol Interpretation: P

| Sub-matrix | Sub-matrix Location Code | | | | | | | | | | |
|---|---|---|---|---|---|---|---|---|---|---|---|
| Value | 1 | 2 | 3 | 4 | 5 | 6 | 7 | 8 | 9 | ... | 25 |
| 0 | X | x | X | | | x | | | | | |
| 1 | x | | | | x | | X | | x | | |
| 2 | x | | x | | X | | | | X | X | |
| — | | x | | X | | | | x | | | |
| — | | | | x | x | X | x | | | x | x |
| 6535 | | X | | | | | | | X | | X |

In the sample variation tables, a lowercase "x" appears where a given sub-matrix corresponds to the character "A" (in Table 1) or to the character "P" (in Table 2). A boldface capital "X" occurs where an "x" appears at the same location on both variation tables, making "A" or "P" a possible interpretation for the same matrix. An inconsistency exists when each column of the first variation table has at least one element in common with each column of the second variation table, producing an intersection of the columns.

Figure 6B:
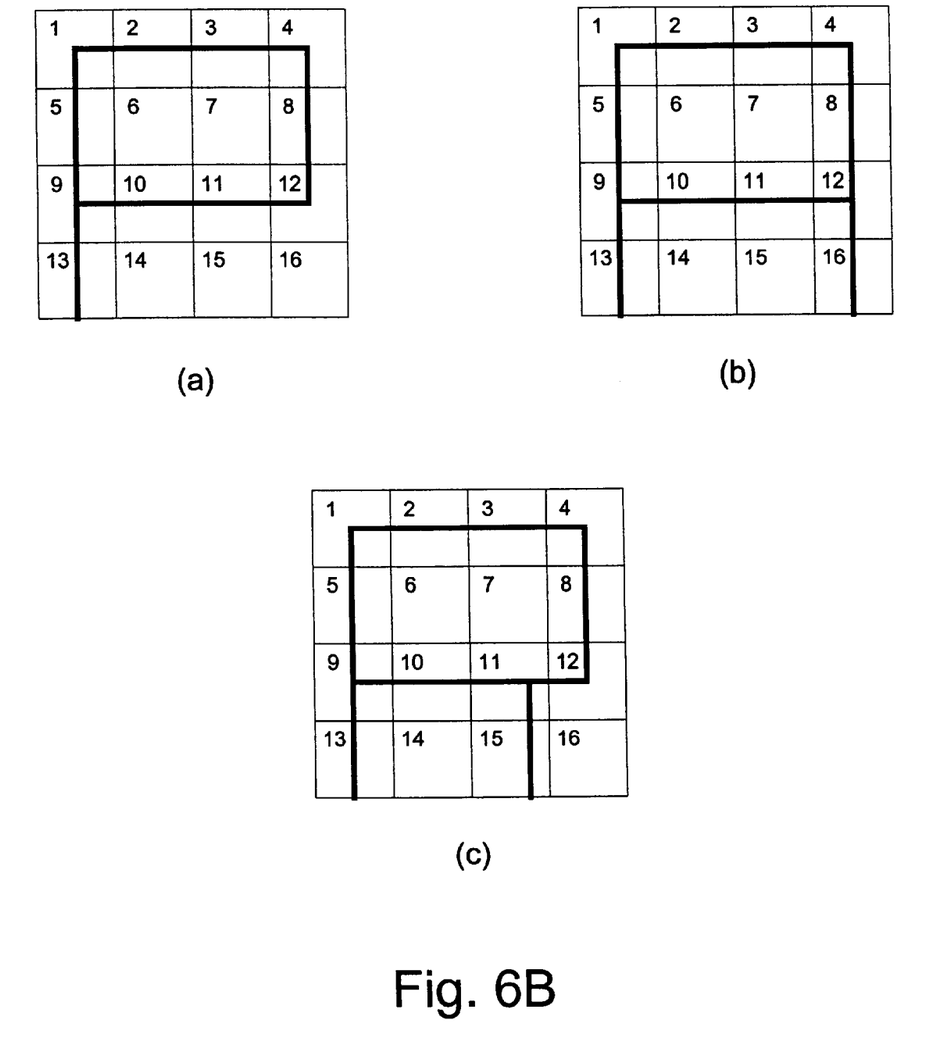
FIG. 6B illustrates the ambiguity problem in accordance with the present invention.

A graphical depiction of how an inconsistency can enter lookup tables 206' is shown in FIG. 6B. For ease of illustration, the referent characters are divided into 16 rather than 25 fragments. When referent (a) is trained, the 16 fragments are associated with the character "P." No ambiguities exist at this point. When training referent (b), the 16 image fragments are associated with the character "A." Again, no ambiguities exist at this point because fragments 12 and 16 differentiate between the two characters. However, when referent (c) is trained, fragments 12 and 16 are no longer discriminatory and may be interpreted as either a "P" or an "A." Thus, the corresponding lookup tables 206' are inconsistent.

Referring again to FIG. 6A, processing continues by eliminating 609 inconsistent table entries. This is accomplished by comparing the current variation table with those created for the prior referent characters. If an intersection is found between two tables, one of the two inconsistent interpretations is selected for deletion. The selection process may be either random or based to a pre-defined selection criterion. Thereafter, the identification bits of the selected interpretation are reset in each lookup table 206' as indicated by the intersection of the two variation tables, e.g., at those locations containing an "X" as shown in Tables 1 and 2. Thus, one of the inconsistent interpretations is deleted and the ambiguity is eliminated.

Finally, a check 610 is made to determine whether there are more referent images to train. If more images exist, control returns to step 601; otherwise, the process terminates after storing 611 the resulting lookup tables 206' in storage device 208.

Referring now to FIG. 7, there is shown a flow diagram for determining candidate set 206" and selecting a preferred candidate character in accordance with the present invention. Processing begins by initializing 701 candidate set 206" in memory 206. One skilled in the art will recognize what data structures may be used to represent the candidate set 206" in memory 206, and how such data structures may be initialized to a null state. Processing continues with addressing 702, for each sub-matrix, one of a plurality of lookup tables 206'. As stated above, this is accomplished by converting the 16 element sub-matrix into a 16-bit integer index into lookup table 206'.

Processing continues with adding 703 to candidate set 206" the characters specified at the addressed location in lookup table 206'. In a preferred embodiment, this is accomplished by decoding the lookup table entry and adding to candidate set 206" each character identified in the table entry. Because a lookup table entry is 128 bits long, between 0 and 128 characters may be added to the candidate set for each sub-matrix. Processing continues by recording 704 the number of occurrences of each candidate. One skilled in the art will recognize that this could be accomplished by adding an occurrence count variable to each member of the candidate set, and incrementing said variable each time the member is identified. A check 705 is made whether there are more sub-matrices to process. If the answer is "yes," then control returns to step 702; otherwise, control is passed to step 706.

Processing continues by choosing 706 the candidate with the highest occurrence rate. This is accomplished by retrieving the occurrence count variable for each candidate, dividing each variable by the number of sub-matrices, and multiplying the quotient by 100. The result is a percentage of the sub-matrices identifying each candidate character. A check 707 is made to determine whether there is more than one candidate with the highest number of occurrences. If the answer is "yes," then control goes to step 710; otherwise, processing continues at step 708. In a preferred embodiment, a check 708 is made to determine whether the selected character received at least a 90% occurrence rate, which represents a quality threshold indicative of a highly likely match. One skilled in the art will recognize that other percentages may be used without departing from the spirit of the invention, although experimental tests have shown that 90% is a desirable threshold figure. If the answer is "yes," then the process terminates 709 by outputting the recognized character on output device 210. If not, control passes to step 712.

Processing continues with resolving 710 ambiguities using either contextual or geometric analysis. Briefly, contextual analysis is the process of resolving ambiguities by referring to the letters or words surrounding the character in question, possibly with reference to a dictionary or the like. For example, in deciding between the letters "E" and "F," the fact that the next two letters were "GG" would suggest that the correct interpretation is "E" (in order to spell the word "EGG.") Similarly, geometric analysis is the process of eliminating impossible candidate choices by examining the geometric properties of the scanned character. For example, in deciding between the letters "W" and "I," by referring back to the size of the original minimally bounding rectangle, the letter "I" could be eliminated if the rectangle was relatively wide. Both techniques are well known to one skilled in the art of optical character recognition. For example, U.S. Pat. No. 5,539,840 to Krtolica et al. for Multifont Optical Character Recognition Using a Box Connectivity Approach, discloses a process of eliminating characters based on geometric properties of the minimal bounding frame.

A check 711 is made as to whether the result is still ambiguous after appealing to contextual or geometric analysis. If the answer is "yes," then processing terminates 712 without a unique solution, such as by outputting an error message on output device 210. If the answer is "yes," then processing terminates 713 by outputting the recognized character on output device 210.

In another preferred embodiment, there is no need to resolve ambiguities as shown in steps 707 through 711, because a consistency check was performed during training in which a variation table was built 608 and all ambiguous choices were eliminated 609. Thus, the preferred candidate character is merely the intersection of the candidates identified for each sub-matrix. If no intersection is found, then the character is unrecognizable and an error message can be sent to output device 210.

Figure 8:
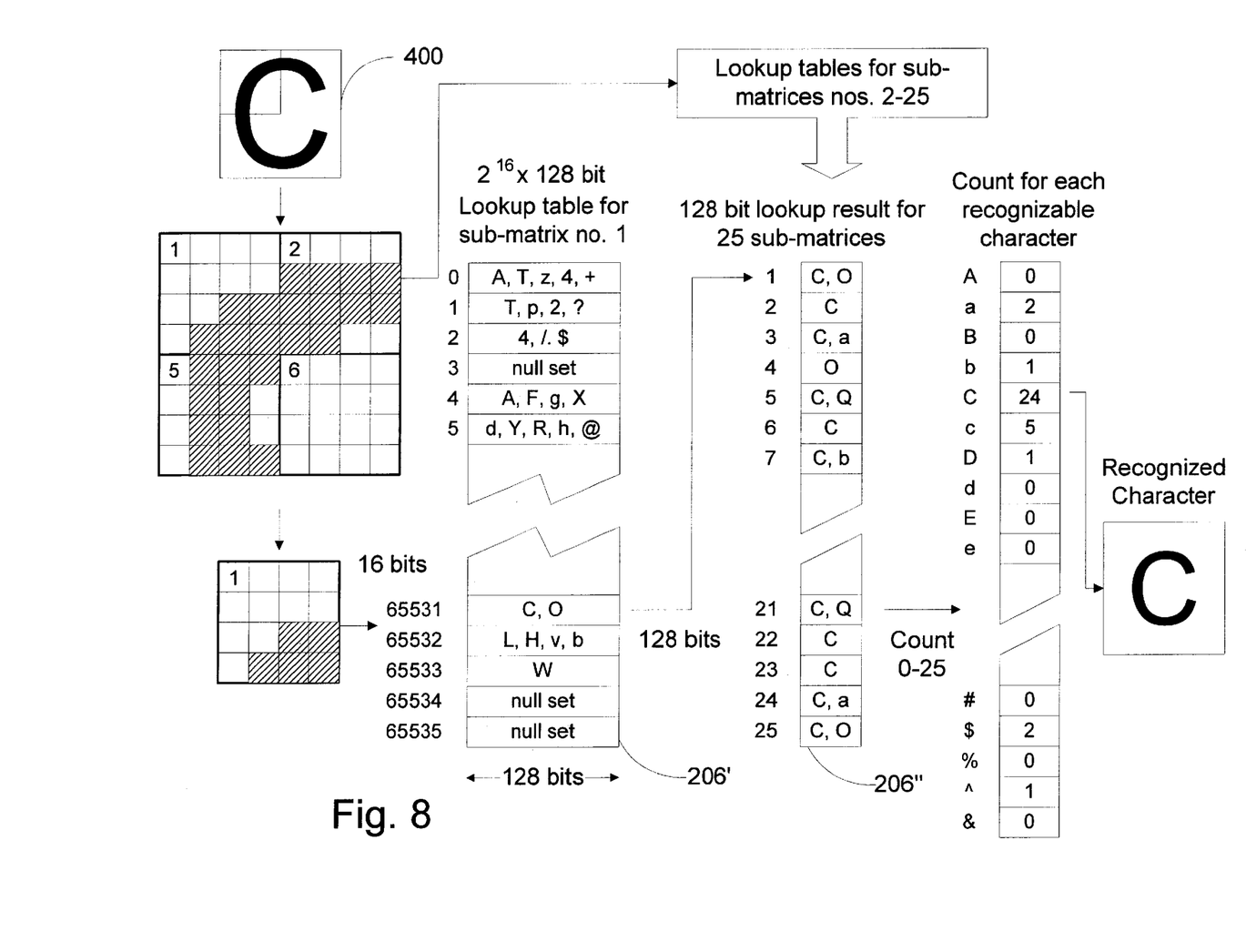
FIG. 8 illustrates the data structures for character recognition in accordance with the present invention.

Referring now to FIG. 8, there is shown the data structures for character recognition in accordance with the present invention. As illustrated, a bitmap 400 of the letter "C" is mapped onto a 16×16 character matrix. Thereafter, said matrix is partitioned into 25 sub-matrices, four of which (nos. 1, 2, 5 and 6) are depicted. Next, sub-matrix no. 1 is converted into a 16 bit index for addressing a $2^{16} \times 128$ bit lookup table 206'. The result is a 128 bit value that, when decoded, identifies between 0 and 128 possible candidate characters for sub-matrix no. 1. As shown in FIG. 8, the letters "C" and "O" are identified as candidates and are added to candidate set 206". In addition, a count is made of the number of occurrences of each character. The process is repeated for sub-matrices nos. 2 through 25. Finally, the occurrence count variables are tabulated and an occurrence rate is calculated. In this case, the letter "C" is identified by 24 of the 25 sub-matrices, or a 96% occurrence rate. Because the letter "C" is a uniquely identified solution, and the occurrence rate exceeds 90%, the letter "C" is selected as the recognized character.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method for training an image recognition system with a set of referent images, each referent image having a known interpretation, the method comprising the steps of:

sub-dividing a matrix representing a referent image into a plurality of sub-matrices representing portions of the referent image;

for each sub-matrix, storing the interpretation of the referent image in a lookup table, each sub-matrix having a different lookup table, each lookup table adapted to associate a sub-matrix with at least one interpretation;

performing a consistency check on the lookup tables to determine whether two discrete interpretations are valid for a set of sub-matrices; and responsive to two discrete interpretations being valid for the set of sub-matrices, removing one of the interpretations from the lookup tables for the set of sub-matrices.

2. An apparatus for recognizing an image, the apparatus comprising:

a computer-readable medium for storing a matrix representing an image to be recognized;

a matrix partitioner, coupled to the computer-readable medium, for sub-dividing the matrix into a plurality of sub-matrices representing portions of the image;

an interpretation set builder, coupled to the matrix partitioner, for determining for each sub-matrix at least one interpretation of the image based upon information contained within the sub-matrix;

a preferred interpretation selector, coupled to the interpretation set builder, for selecting a preferred interpretation of the image from the interpretations associated with the plurality of sub-matrices; and an ambiguity resolver, coupled to the preferred interpretation selector, for selecting among valid interpretations using one of contextual analysis and geometric analysis.

3. An apparatus for recognizing an image, the apparatus comprising:

a computer-readable medium for storing a matrix representing an image to be recognized;

a matrix partitioner, coupled to the computer-readable medium, for sub-dividing the matrix into a plurality of sub-matrices representing portions of the image, wherein the matrix partitioner partitions each 16×16 matrix into at least twenty-five 4×4 sub-matrices, sixteen of the sub-matrices arranged to fill the matrix, and nine of the sub-matrices arranged in a 3×3 configuration at the center of the matrix, each matrix having dimensions of 16×16 elements, and each sub-matrix having dimensions of 4×4 elements;

an interpretation set builder, coupled to the matrix partitioner, for determining for each sub-matrix at least one interpretation of the image based upon information contained within the sub-matrix; and a preferred interpretation selector, coupled to the interpretation set builder, for selecting a preferred interpretation of the image from the interpretations associated with the plurality of sub-matrices.

4. An apparatus for recognizing an image, the apparatus comprising:

a computer-readable medium for storing a matrix representing an image to be recognized, wherein the computer-readable medium comprises N lookup tables, where N equals the number of sub-matrices, each of the lookup tables comprising at least $2^M$ entries of at least X bits each, where M equals the number of elements per sub-matrix, and where X equals the number of recognizable images;

a matrix partitioner, coupled to the computer-readable medium, for sub-dividing the matrix into a plurality of sub-matrices representing portions of the image;

an interpretation set builder, coupled to the matrix partitioner, for determining for each sub-matrix at least one interpretation of the image based upon information contained within the sub-matrix; and a preferred interpretation selector, coupled to the interpretation set builder, for selecting a preferred interpretation of the image from the interpretations associated with the plurality of sub-matrices.

5. An apparatus for training an image recognition system with a set of referent images, each referent image having a known interpretation, the apparatus comprising:

a matrix partitioner for sub-dividing a matrix representing a referent image into a plurality of sub-matrices representing portions of the referent image; and a plurality of lookup tables, coupled to the matrix partitioner, for storing, for each the referent image sub-matrix, the interpretation of the referent image, each sub-matrix having a different lookup table, each lookup table adapted to associate a sub-matrix with at least one interpretation; and a consistency checker for performing a consistency check on the lookup tables to determine whether two discrete interpretations are valid for a set of sub-matrices and, responsive to two discrete interpretations being valid for the set of sub-matrices, removing one of the interpretations from the lookup tables for the set of sub-matrices.

* * * * *

UNITED STATES PATENT AND TRADEMARK OFFICE
CERTIFICATE OF CORRECTION

PATENT NO. : 6,259,814 B1
DATED : July 10, 2001
INVENTOR(S) : Radovan V. Krtolica et al.

It is certified that error appears in the above-identified patent and that said Letters Patent is hereby corrected as shown below:

Column 2,
Line 51, "invention;" should read -- invention; and --;
Line 58, "a" should read -- an --; and
Line 59, "Character" should read -- character --.

Column 3,
Line 33, "table 206" should read -- tables 206' --

Column 4,
Line 37, "$^1/_{16}$frag-" should read -- $^1/_{16}$ frag- --.

Column 6,
Table 1, "6535" should read -- 65535 --; and
Table 2, "6535" should read -- 65535 --;

Column 8,
Line 41, ""yes,"" should read -- "no," --.

Column 10,
Line 46, "the" should be deleted.

Signed and Sealed this

Twenty-third Day of April, 2002

Attest:

*Attesting Officer*

JAMES E. ROGAN
*Director of the United States Patent and Trademark Office*